Feb. 22, 1927.                W. F. CLARK ET AL            1,618,364
                           MOUNTING FOR HEATING UNITS
                              Filed March 23, 1925
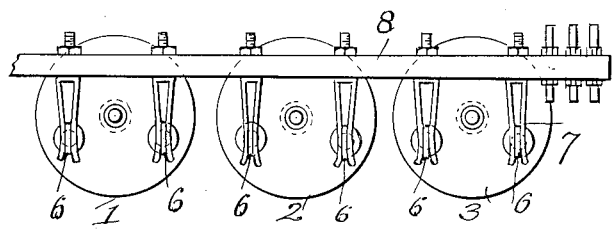
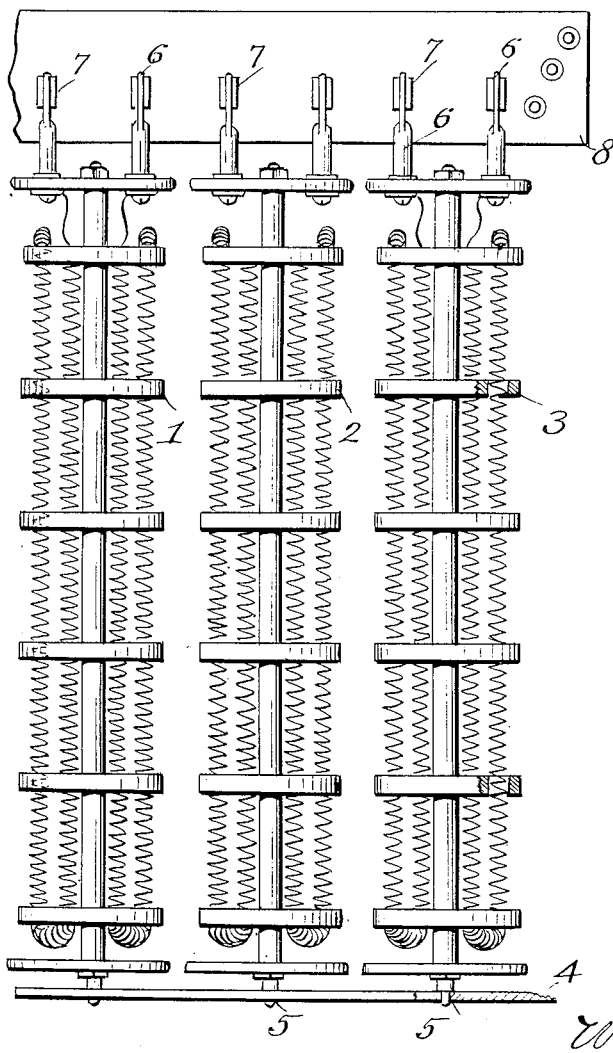
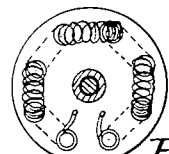
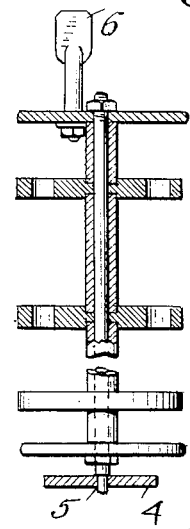
Inventors
Warren F. Clark
and
Emil Strauszky
By Thurston Kwst Hudson
Attorneys Patented Feb. 22, 1927.

1,618,364

UNITED STATES PATENT OFFICE.

WARREN F. CLARK AND EMIL STRANSZKY, OF WARREN, PENNSYLVANIA.

MOUNTING FOR HEATING UNITS.

Application filed March 23, 1925. Serial No. 17,779.

The present invention relates to a mounting for electrical heating elements, and is particularly directed toward a construction in which they may be readily placed upon or removed from their mounting.

Reference should be had to the accompanying drawings forming a part of this specification, in which Fig. 1 is an elevation showing the invention; Fig. 2 is a top plan view; Fig. 3 is a bottom plan view of one of the heating elements; Fig. 4 is a sectional elevation of one of the heating elements.

The present invention is particularly directed toward a construction by which electrical heating elements may be quickly and easily placed upon or removed from a common mounting. It frequently happens that these electrical heating units must be taken out of the mounting in order to inspect the same, or repair the same, and it is desirable that a suitable mounting be provided such that they can be quickly and readily so removed and replaced.

A plurality of units are indicated at 1, 2, 3. The mounting for the lower part of the electrical heating units comprises a transverse bar 4 which is provided with a plurality of openings 5 which are adapted to receive a projecting portion from the lower end of each of the heating units. This projection serves to properly place the lower end of each heating unit with respect to the transverse member 4, and to hold from movement the lower end of the heating element. At the upper end of each heating element there are one or more upwardly extending blade members 6, and these blade members each co-operate with a pair of spring arms 7 which are so arranged that as a blade 6 passes between the spring arms they will be frictionally gripped and held in position. Each pair of spring arms is mounted upon a brace bar 8 which in turn is suitably mounted with respect to the lower frame member 4.

It will be seen that each electrical heating element may be quickly removed by merely pulling the blades 6 from engagement with the spring arms 7, whereupon the heating element may be lifted out because the projection 5 at the lower end thereof merely rests in an opening in the transverse member 4.

Likewise in inserting an electrical heating element it may be readily done by first inserting the projection 5 in an appropriate hole in the member 4, and then moving the blades 6 into contact with the appropriate pairs of spring arms 7.

Having described my invention, I claim:—

1. The combination with an electrical unit of a member adjacent one end of the unit, co-operating means on the unit and the said member whereby the end of the unit is removably supported in said member, one or more blades carried by the said unit, a stationary member adjacent the said blades, and a pair of spring fingers carried by said stationary member for co-operating with each blade of the heating device whereby the heating unit may be readily held or detached.

2. The combination with an electrical heating unit having a projection at one end, a member extending adjacent said end, an opening in said member into which an extension of the heating unit passes to support the end of the heating unit said heating unit having one or more blades at the opposite end thereof, a stationary bar adjacent said blade or blades, one or more pairs of spring fingers carried by said bar, each pair of spring fingers being adapted to engage with a blade thereby to frictionally hold and retain a heating element.

In testimony whereof, we hereunto affix our signatures.

WARREN F. CLARK.
EMIL STRANSZKY.